United States Patent [19]

Skura

[11] 4,270,276

[45] Jun. 2, 1981

[54] METAL WORKING TOOL

[76] Inventor: Martin C. Skura, 7206 Forest Blvd., North Lauderdale, Fla. 33068

[21] Appl. No.: 85,690

[22] Filed: Oct. 17, 1979

[51] Int. Cl.$^3$ .......................... G01B 5/14; B23B 49/02

[52] U.S. Cl. .......................................... 33/189; 33/42; 33/174 G

[58] Field of Search ........................ 33/189, 44, 42, 43, 33/180 R, 174 G, 190, 191

[56] References Cited

U.S. PATENT DOCUMENTS

| | | | |
|---|---|---|---|
| 1,545,424 | 7/1925 | Heimrich | 33/189 |
| 2,647,325 | 8/1953 | Little | 33/197 X |
| 3,731,390 | 5/1973 | Sloan et al. | 33/189 |

*Primary Examiner*—William D. Martin, Jr.
*Attorney, Agent, or Firm*—Malin & Haley

[57] ABSTRACT

A workpiece layout tool for precisely but expeditiously marking a plurality of points to be machined along the workpiece. A slide housing has parallel internal longitudinal grooves which allow the insertion of a slide bar, allowing longitudinal movement of the slide bar in relation to said slide housing. The outside end of the slide housing has two lips which allow the slide housing to be engaged with the reference edge of the workpiece. The outer end of the slide bar has a tab on its underside which rests against the reference edge of the workpiece to maintain a fixed relationship between a plurality of spaced apart holes located along the longitudinal center line of the slide bar and the workpiece. The holes may be threaded to receive appropriate marking implements such as pencil tips, ink tips, or machined scribing tips. A multiplicity of interchangable slide bars with different hole spacing or patterns may be used according to the specific design requirements of the workpiece.

3 Claims, 5 Drawing Figures

METAL WORKING TOOL

BACKGROUND OF THE INVENTION

This invention relates to marking devices, and more particularly, to a workpiece layout tool which is capable of aligning a multiplicity of marking tips to meet a specific design requirement.

In the past, the various devices used for marking have required costly man hours to use in order to maintain the required level of accuracy in the marking of workpieces, especially in the marking of sheet metal used in vehicular transportation and aerospace industries.

By way of example is U.S. Pat. No. 2,618,860, which shows a layout machine for airplane construction. However, the layout machine does not spot a plurality of holes at one time and is not similar to the present invention.

Another example is illustrated in U.S. Pat. No. 3,816,933, which illustrates a precision hole spotting tool. The precision hole spotting tool has a pair of scales laying perpendicularly to each other, one scale being slidable with respect to a body and having a hole in one end. Again, this invention only allows the spotting of one hole at a time.

The third example is shown in U.S. Pat. No. 3,775,857 illustrating a set up tool. The set up tool is comprised of a carriage affixed to the workpiece and a slide bar which is slidably engaged with the carriage. The end of the slide bar has a device for locating a point at which machining is required and thereafter receiving a tool bit for accomplishing the machining operation.

The present invention provides a means for accurately, but quickly locating a multiplicity of points where machining is required, without realigning the tool after each point is marked. A slide housing is engaged with the reference edge of a workpiece, for receiving a slide bar having a multiplicity of holes spaced apart by a predetermined distance along the longitudinal center line of the slide bar. A tab along the outside edge of the slide bar on the underside contacts the reference edge of the workpiece to provide the proper alignment of the slide housing. Once the slide housing is engaged with the edge of the workpiece at a given reference point, the slide bar is inserted until the tab rests against the reference edge of the workpiece and the workpiece is marked at each hole in the slide bar, saving many man hours of time, without sacrificing accuracy of the placement of the marks. Once the marks are inscribed on the workpiece (such as sheet metal), the machine operation can be performed.

SUMMARY OF THE INVENTION

A sheet metal layout tool having a slide housing with lips on the underside of the housing and a moveable slide bar is provided. The lips of the housing are engageable with the reference edge of a workpiece, such that the workpiece stays in exact relationship with the slide housing during the marking process. The underside outside end portion of the slide bar has a tab attached thereto, which contacts the reference edge of the workpiece to maintain a fixed relationship between the slide bar and the workpiece during the marking process. A multiplicity of spaced apart threaded apertures (spaced by a predetermined distance dependent upon the job specifications) run along the longitudinal center line of the slide bar. Marking devices such as pencil tips, ink tips, or machined scribes are mounted in the apertures. Once the housing and the slide bar are in place, a multiplicity of marks (points or lines) can simultaneously be made on the workpiece, without realigning the invention.

It is therefore the primary object of this invention to provide a tool which can be used to locate and mark a multiplicity of points or lines on a workpiece which will be machined, with a single placement of the tool.

It is a further object of this invention to provide a device with interchangable slides pre-constructed with different job patterns so that any machine requirements can be accommodated for different sections of a design layout.

In accordance with these and other objects which will be apparent hereinafter, the instant invention will now be described with particular reference to the accompanying drawings.

DESCRIPTION OF THE PREFERRED EMBODIMENT

Figure 1:
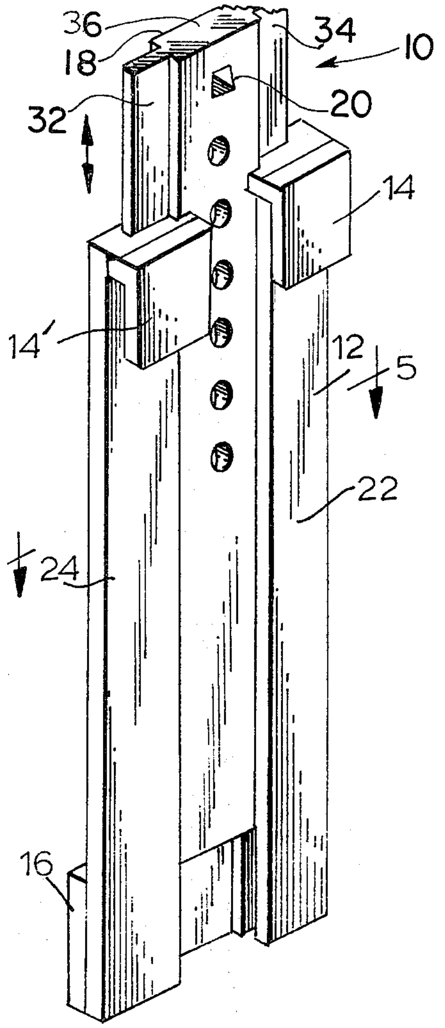
FIG. 1 represents an underside perspective view of the sheet metal layout tool with the slide bar protruding from the outside end of the housing.

Referring primarily to FIG. 1, a sheet metal layout tool 10 is comprised of a slide housing 12 and a slide bar 18 mounted in lateral grooves in housing 12.

Figure 4:
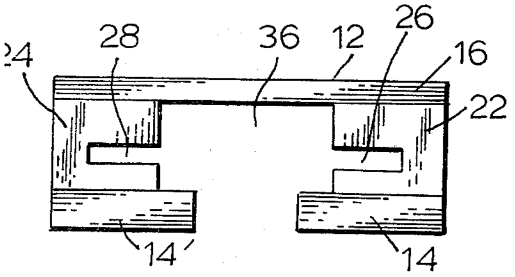
FIG. 4 represents an end elevational view of the slide housing with the slide bar removed.
Figure 5:
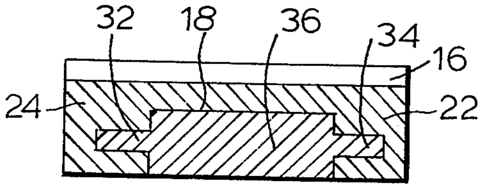
FIG. 5 represents a cross-sectional view of the sheet metal layout tool taken across the lines 5—5 of FIG. 1.

The slide housing 12 is comprised of two longitudinal sections 22 and 24, which are fixed in spaced apart relation by a cross member 16 attached therebetween. As shown in FIG. 4, each longitudinal section 22 and 24 has respectively longitudinal grooves 26 and 28 which are sized for slidably engaging the respective tracking bars 32 and 34 of the slide bar 18. The body portion 36 of the slide assembly 18 is sized to also be slidably engaged with the larger longitudinal groove 30 of the housing 12.

Figure 2:
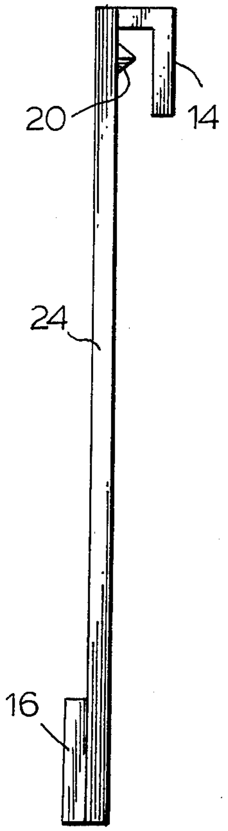
FIG. 2 represents a side elevational view of the right side of the guide assembly of the workpiece layout tool.
Figure 3:
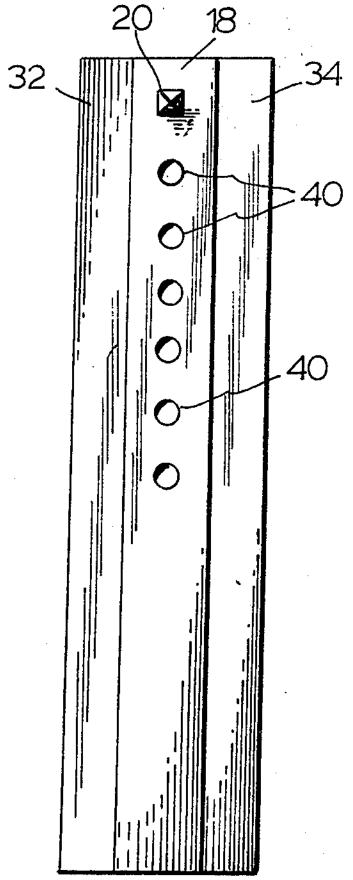
FIG. 3 represents a bottom plan view of the sheet metal layout tool.

The outer end of each longitudinal section 22 and 24 has a respective engaging lip 14 and 14' attached thereto, which are more clearly defined in FIG. 2. The engaging lips 14 and 14' slidably receive the reference edge of the workpiece maintaining a constant relative position between the slide housing and the workpiece. The slide bar 18 is then inserted into the slide housing until the tab 20 on the underside of the slide bar 18 contacts the reference edge of the workpiece. The workpiece is then ready to be marked with any marking device (pencil tip, ink tip, or machined scribe) mounted through the multiplicity of apertures 40 which are spaced apart along the longitudinal center line of the slide bar 18 by a predetermined distance to meet the design requirements of the workpiece, as shown in FIG. 3.

The slide bar 18 is removable such that a plurality of different slide bars (different hole patterns dependent upon the particular job) can be used in housing 12.

The tool may be used with a templet disposed on the workpiece, using reference points on the templet, or directly on the workpiece. The tool can apply lines or points on the templet or workpiece surface that can be used for marking areas or points to be machined. Lines formed with one slide bar can be crossed with lines from a different slide bar to create marking points for machine drilling or tapping of holes on the workpiece at design points.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A workpiece layout tool for locating points or a workpiece for marking, comprising:

a slide housing;

a slide bar moveably mounted within said slide housing such that said slide bar can be moved in longitudinal relation to said slide housing, said slide bar having a plurality of marking apertures disposed therethrough in a predetermined spaced apart relationship;

a workpiece engaging means connected to said housing in a constant, relative position with said workpiece, said workpiece engaging means including two L-shaped lips fixed to the outer end of said housing, sized for slidably receiving said workpiece.

2. A workpiece layout tool as recited in claim 1 wherein said housing includes:

cross member;

two longitudinal members fixed in parallel spaced apart relation to said cross member at their respective inside ends, each said longitudinal member having a longitudinal groove along its inner edge; and said slide bar having a body and two tracking bars, said body being sized to fit between said longitudinal members of said housing, said tracking bars being positioned and sized to slidably engage with said longitudinal grooves of said longitudinal members of said housing to allow longitudinal movement of said slide bar with respect to said housing.

3. A workpiece layout tool as recited in claim 1 wherein said slide bar aligning means is comprised of:

a tab fixed to the underside of the outside end of said slide bar, said tab being brought into contact with the reference edge of said workpiece.

* * * * *